Nov. 3, 1936.    A. B. RYAN    2,059,401
BELT CLAMP FILLER
Filed April 16, 1935
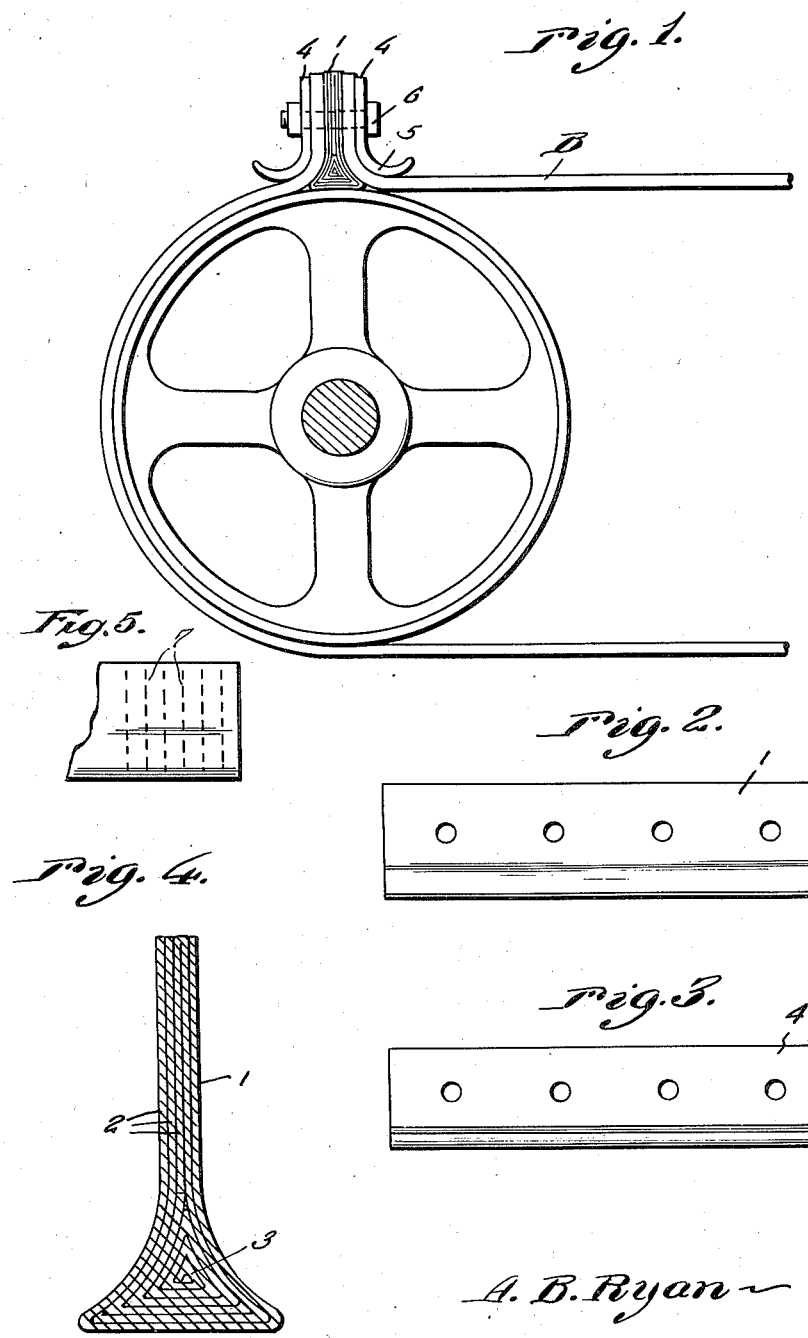
Inventor
A. B. Ryan
By Clarence A. O'Brien
Attorney Patented Nov. 3, 1936

2,059,401

UNITED STATES PATENT OFFICE 2,059,401

BELT CLAMP FILLER

Alexander Boggs Ryan, Kilgore, Tex.

Application April 16, 1935, Serial No. 16,703

1 Claim. (Cl. 24—37)

This invention relates to a belt clamp filler, the present invention being an improvement over that patented to W. W. Donnelly No. 1,543,559, the general object of the present invention being to eliminate certain disadvantages existing in the patented device by making the filler entirely of fabric and eliminating the rubber core on the patented device.

This invention also consists in certain other features of construction and in the combination and arrangement of several parts, to be hereinafter fully described, illustrated in the accompanying drawing and specifically pointed out in the appended claim.

In describing the invention in detail, reference will be had to the accompanying drawing wherein like characters denote like or corresponding parts throughout the several views, and in which:—

Figure 1 is a view showing a belt passing over a pulley with the ends of the belt connected together by a clamp containing the improved filler.

Figure 2 is an elevation of one of the clamping plates.

Figure 3 is an elevation of the filler.

Figure 4 is a transverse sectional view through the filler.

Figure 5 is a fragmentary elevation, showing a filler in which the fabric plies are connected together by stitching.

As shown in this drawing the filler 1 is composed entirely of several plies 2 of fabric such as canvas and duck with the plies closely vulcanized together by impregnating them with any suitable form of rubber balata gum or the like after which the device is vulcanized in the usual manner. As it will be seen from Figure 4 the core 3 in the enlarged end of the filler is entirely composed of this vulcanized fabric so that the rubber core of the beforementioned patent is omitted. If desired, the plies of fabric may be stitched together, as shown at 7 in Figure 5.

It has been found that the core of the beforementioned patent does not last as it has a tendency under heat and wear to disintegrate and work out at the ends of the filler, thus leaving the filler without a core or center to help take the wear and shock.

As shown the clamp includes a pair of clamping plates 4 having their inner ends curved as shown at 5 with the filler placed between the ends of the belt which extend between the two plates. Bolts 6 connect the two plates, the ends of the belt B and the filler together. The inner end of the filler is of substantially triangular shape with its walls rounded to conform to the curve produced by bending the ends of the belt outwardly and the base of the filler will conform itself to the crown of the pulley.

This invention can also be used with the clamp forming the subject matter of the patent to J. E. Urschell No. 1,536,278 as the improved filler being of yieldable material will conform itself exactly to the shape of the pulley that it passes over even if the crown should vary slightly.

It is thought from the foregoing description that the advantages and novel features of the invention will be readily apparent.

It is to be understood that changes may be made in the construction and in the combination and arrangement of the several parts, provided that such changes fall within the scope of the appended claim.

What is claimed is:—

A filler for belt clamps comprising a triangular-shaped body constructed of coherent fabric pieces, said triangular-shaped construction being provided with a multi-ply shank constructed of a plurality of plies of fabric cohered together.

ALEXANDER BOGGS RYAN.